(12) United States Patent
Jeong et al.

(10) Patent No.: US 7,178,160 B2
(45) Date of Patent: Feb. 13, 2007

(54) DEVICE FOR RECEIVING SATELLITE BROADCAST AND A RECEIVING METHOD THEREFOR

(75) Inventors: Ki-Won Jeong, Kunpo (KR); Joong-Jeh Park, Seoul (KR); Min-Gu Kim, Kwangiu (KR); Jang-Hee Lee, Seoul (KR); Yong-Kook Lee, Seoul (KR)

(73) Assignee: Handan Broadinfocom Co., Ltd., Seoul (KR)

( * ) Notice: Subject to any disclaimer, the term of this patent is extended or adjusted under 35 U.S.C. 154(b) by 1173 days.

(21) Appl. No.: 09/840,515

(22) Filed: Apr. 23, 2001

(65) Prior Publication Data

US 2002/0007489 A1 Jan. 17, 2002

Related U.S. Application Data

(62) Division of application No. 09/398,838, filed on Sep. 16, 1999, now Pat. No. 6,334,218.

(51) Int. Cl.
*H04N 7/20* (2006.01)

(52) U.S. Cl. .......................... 725/72; 725/68; 455/3.02; 343/757; 343/760; 342/359

(58) Field of Classification Search ................... 725/63, 725/68, 70, 72; 455/FOR. 215, 3.02; 343/760, 343/766, 757; 348/570; 342/359, 368, 449, 342/420, 354
See application file for complete search history.

(56) References Cited

U.S. PATENT DOCUMENTS

| 5,214,364 A | 5/1993 | Perdue et al. ............... 318/600 |
| 5,296,862 A * | 3/1994 | Rodeffer et al. ............. 342/359 |
| 5,313,651 A | 5/1994 | Kurita ......................... 455/3.2 |
| 5,376,941 A | 12/1994 | Fukazawa et al. .......... 342/359 |
| 5,493,310 A | 2/1996 | Ota ............................. 343/760 |
| 5,515,058 A | 5/1996 | Chaney et al. .............. 342/359 |
| 5,797,083 A | 8/1998 | Anderson ..................... 455/25 |
| 5,886,999 A | 3/1999 | Kojima et al. ............... 371/5.5 |
| 5,955,988 A * | 9/1999 | Blonstein et al. ........... 342/359 |
| 5,966,638 A | 10/1999 | Mita et al. ................... 455/6.3 |
| 5,983,071 A | 11/1999 | Gagnon et al. .............. 455/3.2 |

FOREIGN PATENT DOCUMENTS

EP 0963067 A2 8/1999

* cited by examiner

*Primary Examiner*—Ngoc Vu
(74) *Attorney, Agent, or Firm*—IPLA P.A.; James E. Bame

(57) ABSTRACT

A satellite broadcast receiver comprises an antenna, a tuner, a modulator, a FEC decoder, a microprocessor, and an antenna driver. The antenna receives the satellite signal and the tuner tunes the satellite signal received by the antenna, and the modulator modulates the satellite signal tuned by the tuner into digital signal, the FEC decoder corrects a position error of the satellite antenna using the signal modulated by the modulator, and outputs a corresponding output signal, and the microprocessor receives the signal modulated by the modulator and the output signal of the error corrector, and outputs a control signal which controls the position of the antenna, and the antenna driver drives the antenna in accordance with the control signal of the microprocessor. The satellite broadcast receiver enables a user to detect satellites fast and see satellite broadcast conveniently.

16 Claims, 14 Drawing Sheets

FIG.7 graphig menu

| C11 | East limit | [4000] |
| C12 | West limit | [6000] |
| C13 | Satellite | [ASTRA] |
| C14 | Position Move | [E5000W] |
| C15 | Position offset | [ +10 ] |
| C16 | Start Auto Position Search for ASTRA |
| C17 | Start Auto Position & Channel Search for ASTRA |
| C18 | Start Auto Position & Channel Search for Selected SAT |

C19  EL — P2 — WL
C20  Medium  73%
C21  Strength Poor  Good

DEVICE FOR RECEIVING SATELLITE BROADCAST AND A RECEIVING METHOD THEREFOR

This application is a divisional of U.S. application Ser. No. 09/398,838, filed Sep. 16, 1999, now U.S. Pat. No. 6,334,218 which claims priority from Korean Application Nos. 98-20778, (filed Jun. 5, 1998), 98-38426, (filed Sep. 17, 1998), 99-8099, (filed Mar. 11, 1999), and 99-10038, (filed Mar. 24, 1999).

BACKGROUND OF THE INVENTION (a) Field of the Invention

The present invention relates to a device for receiving satellite broadcast and a receiving method therefor, and more particularly to a device for receiving satellite broadcast and a method therefor which enable users to conveniently view versatile satellite broadcast.

(b) Description of the Related Art

In order to watch broadcast programs via a satellite, a satellite antenna which receives satellite signals, a set-top box which processes the received signals, and a display device which displays the signals processed by the set-top box are needed.

For the optimal viewing of a satellite broadcast, the satellite antenna should be positioned to the direction of the satellite which transmits the satellite broadcast. Accordingly, the position information of satellites which transmit various satellite broadcasts should be pre-set at initial stage to enable the convenient viewing of satellite broadcasts.

Satellite broadcasts are classified into analog satellite broadcasts and digital satellite broadcasts, and set-top boxes which process the satellite broadcast signals and control the movement of the antenna are classified into analog set-top boxes and digital set-top boxes.

Methods for searching satellite signals vary in accordance with the kind of satellite targeted. The different methods for searching satellite signals are as follows.

In the analog set-top box, the user determines whether the satellite broadcast displayed on the display device is the desired satellite broadcast by changing the direction of the antenna, and inputs the position information of the determined satellite into the analog set-top box. In this way, the position information of the desired satellites is stored in the analog set-top box.

FIG. 1 shows a position relation between the satellite antenna and the satellites.

Assuming that there are two satellites, satellite A and satellite B, as shown in FIG. 1, if the user wants to watch the satellite broadcast transmitted from satellite B, the user of the analog set-top box confirms whether the satellite is satellite B, based on the image displayed on the display device, by changing the direction of the antenna.

However, in the conventional analog set-top box, if the position of the satellite antenna is directed to a middle area between satellite A and satellite B, since the user does not have information about how far the satellite is from the position of the antenna and the present direction of the satellite antenna, the desired satellite can be found only by checking if the image displayed on the display device is the desired image.

With regard to the conventional digital set-top box, there are difficulties in finding the position of satellite, because the image transmitted from the digital satellite can not be displayed on the display device in real time. As a result, each one of the separate satellite antenna must be used for each satellite, thereby requiring a large number of satellite antennas in the case where the user desires to watch various satellite broadcast.

Another problem of the conventional satellite broadcast receiver is the complicated process of the user's setting the position information of satellites manually based on the status of the image displayed on the display device.

In case that a desired satellite is added, the user finds the added satellite using the signal transmitted from the satellite by changing the direction of the satellite antenna. This process is inconvenient and time-consuming especially when the user desires to watch a large number of satellite broadcasts.

SUMMARY OF THE INVENTION

It is therefore an object of the present invention to provide a satellite broadcast receiver and a method for receiving satellite broadcasts which enables users to detect a position of satellites and watch satellite broadcasts conveniently based on the detected position of satellites.

It is another object of the present invention to provide a satellite broadcast receiver and a method for receiving satellite broadcast which enable users to detect satellites conveniently by displaying graphic and numerical menus to indicate positions of the satellite and direction of a satellite antenna.

It is still another object of the present invention to provide a satellite broadcast receiver and a method for receiving satellite broadcast which model the position information of pre-found satellites and detects other satellites based on the modeled position information.

It is still yet another object of the present invention to provide a satellite antenna driver which does not overload such that the abnormal operation of the satellite antenna is prevented.

These and other objects are provided, according to the present invention, by providing a digital satellite broadcast receiver including an antenna for receiving a satellite signal, a tuner for tuning the satellite signal received by antenna, a demodulator which demodulates the satellite signal tuned by tuner into digital signal, an error corrector which corrects errors of the signal demodulated by the demodulator, a microprocessor which receives the signal modulated by the modulator and the output signal of the error corrector, and outputs a signal which controls the position of the antenna, and an antenna driver which drives the antenna in accordance with the control of the microprocessor.

A digital & analog combined satellite broadcast receiver of the present invention comprises a satellite antenna, an analog set-top box, a digital set-top box, a graphic menu generator, and a display device. The satellite antenna moves and receives the satellite signal. The analog set-top box receives analog signal among the signal from the satellite and converts the analog satellite signal into image signal, and controls the direction of the satellite antenna. The digital set-top box receives digital signal among the signals received from the satellite, and converts the digital signal into image signal, and controls the direction of the satellite antenna. The graphic menu generator receives the output signals of the digital set-top box and the analog set-top box and then generates a plurality of graphic menus for performing many operations of detecting satellites. The display device displays the graphic menus on the display device which are generated by the graphic menu generator.

The graphic menu generator comprises a synchronizing signal detector which receives the image signal from the analog set-top box and detects horizontal synchronizing signal and vertical synchronizing signal; an MPEG decoder which receives the horizontal synchronizing signal and vertical synchronizing signal detected by the synchronizing signal detector, and generates and outputs the digital graphic menu signal and the position information of the digital graphic menu, and which receives the digital image signal from the digital set-top box, and decodes and outputs the digital image signal; a timing controller which receives the position information of the digital graphic menu from the MPEG decoder and controls the timing of the synchronizing signal appropriate to a standard video synchronizing signal; and a video switch which receives the digital graphic menu signal and the digital image signal from the MPEG decoder and the analog image signal from the analog set-top box, and outputs the analog image signal, the digital graphic menu signal, and the digital image signal selectively in accordance with the position information of digital graphic menu.

An antenna driving device of the present invention, which gains power from AC power source and controls direction of antenna, comprises a first plurality of switches, a power supply, a second plurality of switches, and a motor. The switches are connected to the AC power source. The power supply is connected to the switches and receives AC current from the AC power source and outputs DC current which has specified voltage. The switches are connected to the power supply. The motor is connected to the switches and receives the DC current when switches and switches are connected simultaneously, and controls the position and the direction of the antenna by controlling the rotation direction of motor and the rotation number of motor. It is preferable that the switches are connected after the switches are connected.

A method for receiving digital satellite broadcast of the present invention which comprises the steps of (a) setting moving limits of satellite antenna, (b) detecting satellites by measuring the signal strength received by the satellite antenna with changing the direction of the satellite antenna, (c) confirming the verification information of the desired satellite, (d) setting the direction of the satellite antenna by correcting error, (e) comparing the verification information of the desired satellite and the verification information of the detected satellite (f) changing the direction of the satellite antenna if the verification information of the desired satellite does not correspond to the verification information of the detected satellite, and (g) storing the position and the verification information of the detected satellite if the verification information of the desired satellite agrees with the verification information of the detected satellite.

A method for receiving satellite broadcast of the present invention comprises steps of (a) setting the quantitative moving limit of the satellite antenna, (b) displaying the present direction of the satellite antenna with a graphic menu indicating the present direction of the satellite antenna on a first bar menu indicating the moving limit of the satellite antenna, (c) displaying the magnitude of the signal received by the satellite antenna with a graphic menu on the display device, (d) determining if the detected satellite is the desired satellite when the signal received by the satellite antenna is maximum, and (e) storing a relative position of the detected satellite and displaying the relative position of the detected satellite with a small bar menu on a second bar menu indicating the moving limit of the satellite antenna in the display device.

Another method for receiving satellite broadcast comprises steps of (a) determining if a setting of the satellite position is an initial setting of the satellite position, (b) setting the moving limit of the satellite antenna, if the setting of the satellite position is an initial setting of the satellite position, (c) detecting a plurality of satellites with changing the direction of the satellite antenna, (d) modeling a function of the relation between the position of the satellites and the direction of the satellite antenna, (e) finding an approximate direction of the satellite antenna to a satellite except the pre-found satellites using the function of the relation between the position of the satellites and the direction of the satellite antenna, and (f) finding an accurate direction of the satellite antenna by controlling the direction of the satellite antenna minutely.

BRIEF DESCRIPTION OF THE DRAWINGS

FIG. 7 shows a display device when receiving digital satellite broadcast in accordance with the second embodiment of the present invention.

DETAILED DESCRIPTION OF THE PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

A first embodiment of present invention will be described hereinafter.

Figure 1:
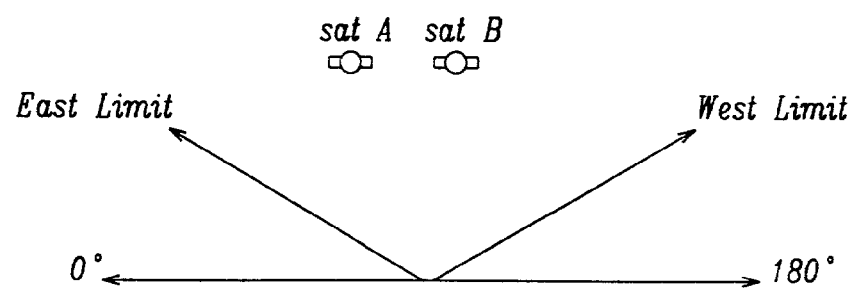
FIG. 1 shows a position relation between satellites and a satellite antenna.
Figure 2:
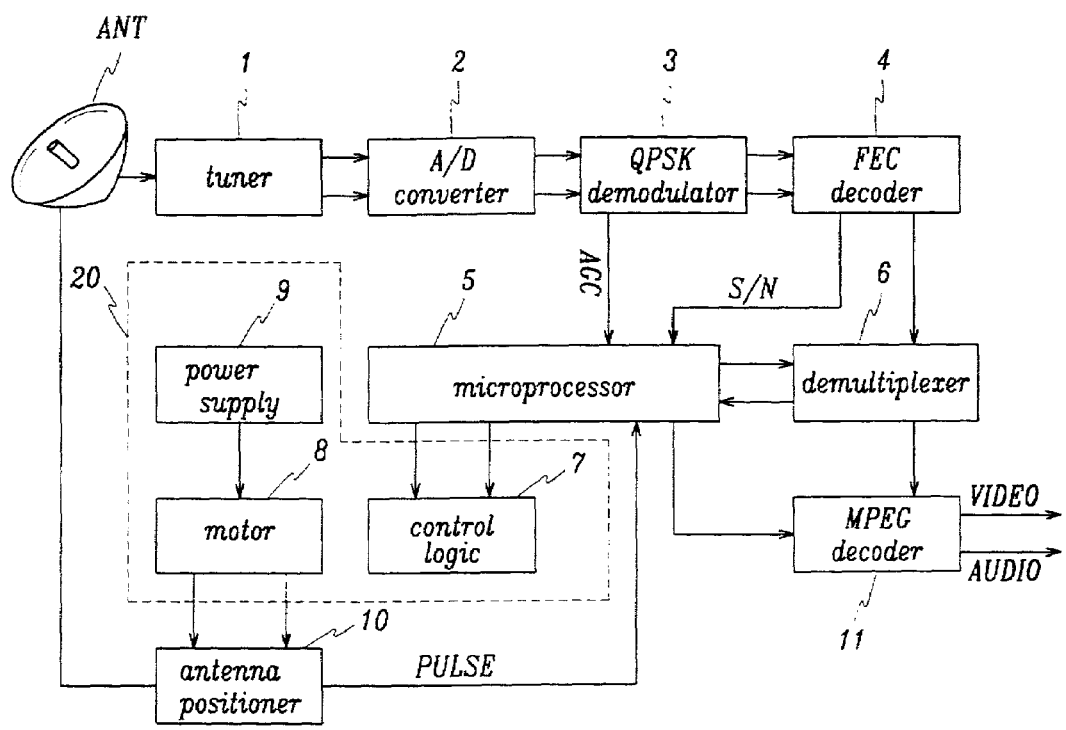
FIG. 2 shows a satellite broadcast receiver in accordance with a first embodiment of the present invention.

FIG. 2 shows a digital satellite broadcast receiver in accordance with a first embodiment of the present invention.

As shown in FIG. 2, the digital satellite broadcast receiver comprises an antenna ANT for receiving satellite signals, a tuner 1 for tuning the satellite signals received by the antenna, an A/D converter 2 for converting analog signals into digital signals, a quadrature phase shift keying (QPSK) demodulator 3 which demodulates the satellite signals tuned by tuner 1 into digital signals, a forward error correction (FEC) decoder 4 which corrects an error signal demodulated by the QPSK demodulator 3, a demultiplexer 6 which demultiplexes output signals of the FEC decoder 4, a microprocessor 5 which receives the signals demodulated by the QPSK demodulator 3 and the output signals of the FEC decoder 4, and outputs a signal which controls the position of the antenna, an antenna driver 20 which drives the antenna in accordance with the control of the microprocessor 5, and an MPEG decoder 11 which decodes output signals of the demultiplexer 6.

The antenna driver 20 comprises a control logic 7 which transfers the control signals of the microprocessor, a motor 8 for driving the satellite antenna, and a power supply 9 which supplies the power to the motor 8.

Figure 3:
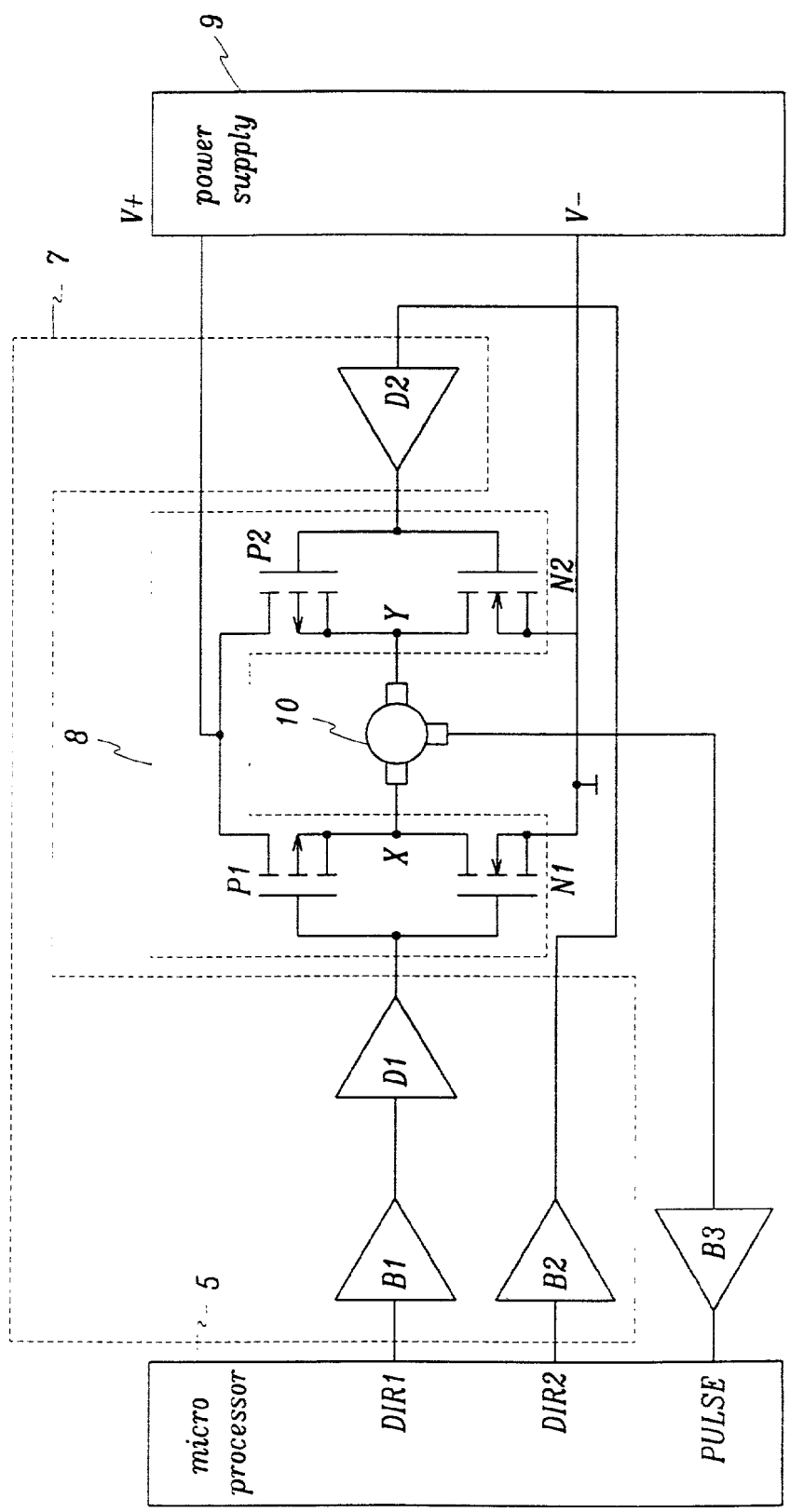
FIG. 3 shows a motor driver of a satellite antenna in accordance with the first embodiment of the present invention.

FIG. 3 shows a motor driver of a satellite antenna in accordance with the first embodiment of the present invention.

As shown in FIG.3, the antenna driver 20 comprises the power supply 9 to supply power to MOSFETs P1, P2, N1, N2, and buffers B1, B2, B3, and gate drivers D1, D2. Gates of the MOSFETs P1, P2, N1, N2 are connected to the microprocessor 5 to output logic signals and the antenna positioner 10 is connected between a common drain of the MOSFET P1 and MOSFET N1 and common drain of the MOSFET P2 and MOSFET N2.

A first signal from a first output terminal DIR1 of the microprocessor 5 goes through the buffer B1 and the gate driver D1 and is inputted into a common gate terminal of the MOSFET N1 and MOSFET P1. A second signal from a second output terminal DIR2 of the microprocessor 5 goes through the buffer B2 and the gate driver D2 and is inputted into the common gate terminal of the MOSFET N2 and MOSFET P2. The power supply 9 supplies power to a common source terminal of MOSFETs P1, P2 and a common source terminal of MOSFETs N1 and N2. The antenna positioner 10 is connected to a common drain terminal of the MOSFETs N1, N2, P1, P2.

The operation of the MOSFETs N1, N2, P1, P2 in accordance with the signals of the first output terminal DIR1 and the second output terminal DIR2 is shown in Table 1 below.

TABLE 1

| DIR2 | DIR2 | P1 | N1 | P2 | N2 |
|------|------|-----|-----|-----|-----|
| LOW  | LOW  | ON  | OFF | ON  | OFF |
| LOW  | HIGH | ON  | OFF | OFF | ON  |
| HIGH | LOW  | OFF | ON  | ON  | OFF |
| HIGH | HIGH | OFF | ON  | OFF | ON  |

As shown in Table 1, the MOSFETs P1 and P2 are ON and the MOSFETs N1 and N2 are OFF, if a LOW signal outputted from the first output terminal DIR1 and the second output terminal DIR2 of the microprocessor 5. In this case, since a voltage between terminal X and terminal Y is not generated, the satellite antenna does not move.

The MOSFETs N1 and N2 are ON and the MOSFETs P1 and P2 are OFF, if a HIGH signal outputted from the first output terminal DIR1 and the second output terminal DIR2 of the microprocessor 5. In this case, since the voltage between terminal X and terminal Y does not generate, the satellite antenna does not move.

The MOSFETs P1 and N2 are ON and the MOSFETs N1 and P2 are OFF, if a LOW signal outputted from the first output terminal DIR1 and a HIGH signals outputted from the second output terminal DIR2 of the microprocessor 5. In this case, since the voltage of the terminal X is higher than the voltage of the terminal, current flows from the terminal X to the terminal Y.

The MOSFETs N1 and P2 are ON and the MOSFETs N2 and P1 are OFF, if a HIGH signal outputted from the first output terminal DIR1 and a LOW signal outputted from the second output terminal DIR2 of the microprocessor 5 processor 5. In this case, since the voltage of the terminal Y is higher than the voltage of the terminal X, current flows from the terminal Y to the terminal X.

The rotational direction of the antenna positioner 10 when a HIGH signal outputted from the first output terminal DIR1 and a LOW signal outputted from the second output terminal DIR2 of the microprocessor 5 is different from the rotational direction of the antenna positioner 10 when a LOW signal outputted from the first output terminal DIR1 and a HIGH signal outputted from the second output terminal DIR2 of the microprocessor 5.

The MOSFET can be replaced by a switching element like a switch.

In general, satellites used in receiving satellite broadcast are geostationary satellite which revolves along the geosatationary orbit above the equator with the same velocity of the rotation velocity of the earth. Accordingly, the satellite antenna does not need mobility of up and down and needs mobility of right and left only. So, the satellite antenna driver changes the direction of the satellite antenna only in the direction of the right and left.

When the satellite antenna changes direction, the antenna driver 10 generates a pulse which has a constant period. Number of motor's rotation can be known by the pulse and azimuth angle of the satellite antenna can be known by the number of motor's rotation. The pulse generated in the antenna driver 10 is transferred to the microprocessor 5.

The operation of the digital satellite broadcast receiver in accordance with the first embodiment of the present invention is explained hereinafter with reference to the figures.

Figure 4:
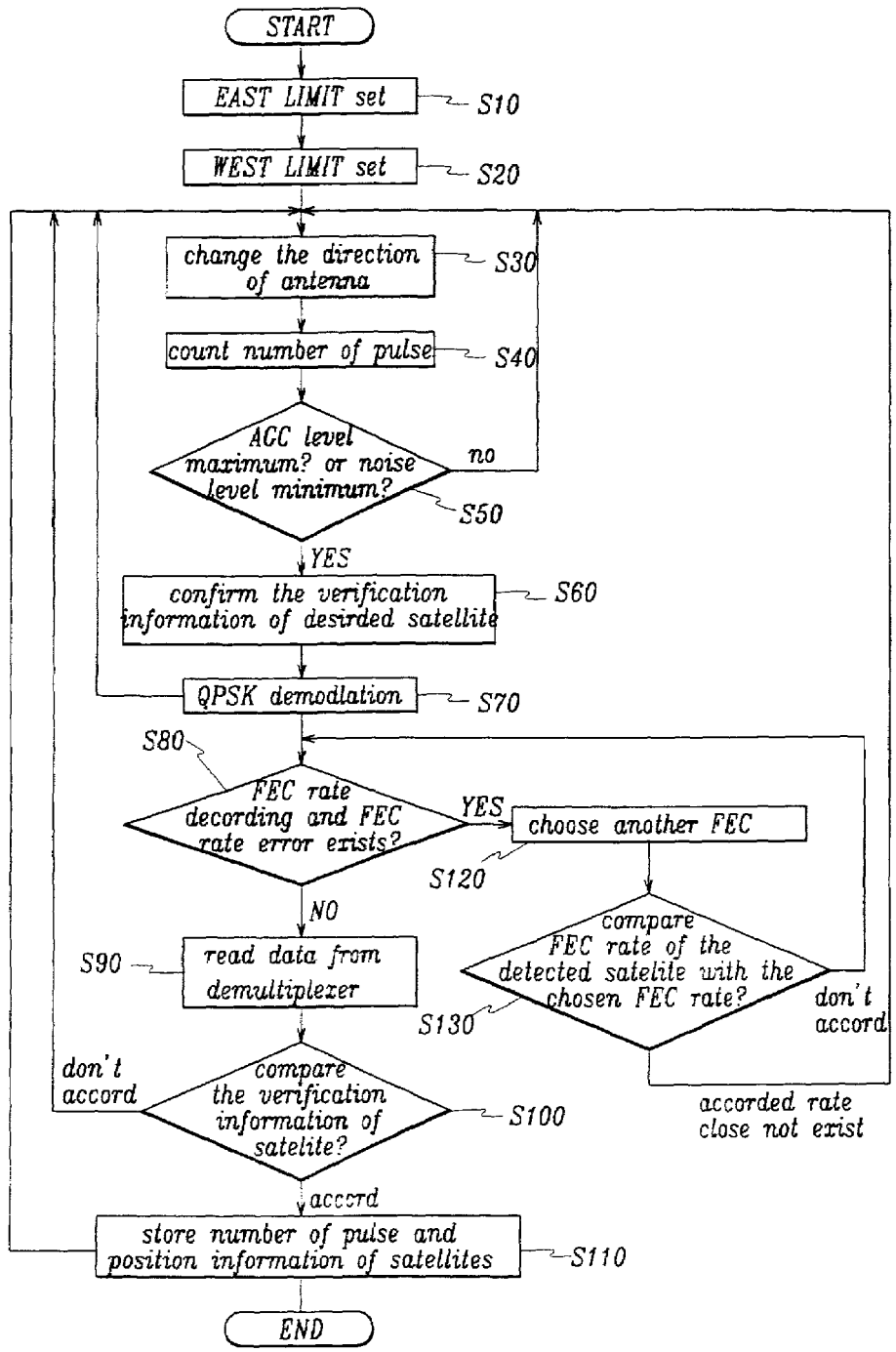
FIG. 4 shows a flow chart of a method for receiving satellite broadcasts in accordance with the first embodiment.

FIG. 4 shows a flow chart of a method for receiving satellite broadcast in accordance with the first embodiment.

Firstly, the present invention set the moving limits of the satellite antenna to the west and to the east(S10, S20). The west moving limit can be set first or the east limit can be set first.

Thereafter, the present invention changes the direction of the satellite antenna from a moving limit of the satellite antenna to the other moving limit of the satellite antenna. (S30) The change of direction of the satellite antenna are performed by the antenna driver 10.

Since the pulse of a constant period are generated from the motor 8 of the antenna driver 10, if the direction of the satellite antenna is changed, how far the direction of the satellite antenna is from the moving limit of the satellite antenna can be known by counting the number of pulses. (S40)

The microprocessor confirm an automatic gain control (AGC) level and noise level of the tuner 1, with the satellite antenna moving. (S50)

If the AGC level reaches a maximum or the noise level reaches a minimum, that means by finding a satellite and stop changing the direction of the satellite antenna. If the AGC level is not maximum and the noise level is not minimum, continue to change the direction of the satellite.

After the receiver of the present invention finds a satellite of which AGC level is maximum or noise level is minimum, the receiver detects verification information about the desired satellite. (S60) The verification information of satellites is a transponder information and channel information. The verification information of the satellites in the area where the satellite antenna is located is pre-stored in the microprocessor 5.

Thereafter, the signals received by the satellite antenna is demodulated by the QPSK demodulator 3, if the AGC level is maximum or the noise level is minimum. (S70)

The demodulated signals by the QPSK demodulator 3 are used to control the direction of the satellite antenna minutely by the FEC decoder 4.

To performing the minute control of the direction of the satellite antenna after finding the satellite with the AGC level and noise level is due to the reason the received signal may be transmitted from the satellite not to want to watch.

The minute control of the direction of satellite antenna is done by the FEC decoder 4. That is, until an error rate of the FEC decoder 4 is minimum, the minute control of the direction of the satellite antenna is done.

The minute control of the satellite antenna done by the FEC decoder 4 will be explained hereinafter.

Each digital satellite has its own FEC rate. In general, the FEC rate is rate which is used for checking if a satellite signal is transmitted without error and compensating for the error, and has several values which are standardized. In the present invention, the FEC rate is used for detecting satellites. That is, if the satellite receiver detects a signal of which FEC rate is among the several standardized FEC rates, it means that the satellite receiver detects a digital satellite receiver.

The FEC decoder 4 decodes the satellite signal and checks if there exists a FEC rate in the decoded signal of the detected satellite and if there is error between the FEC rate of the detected satellite and a FEC rate among the several standardized FEC rates (S80).

If there is error between the FEC rate of the detected satellite and a FEC rate among the several standardized FEC rates, the FEC decoder chooses another FEC rate among the several standardized FEC rates. (S120)

Then, the FEC decoder 4 compares the chosen FEC rate with the FEC rate of the detected satellite. (S130)

If the chosen FEC rate does not accord with the FEC rate of the detected satellite, the FEC decoder 4 chooses all the other FEC rates available and compares the chosen FEC rate with the FEC rate of the detected satellite.

If there is not any FEC rate among the several standardized FEC rates which accords with the FEC rate of the detected satellite, the satellite receiver restarts to change the direction of the satellite antenna, that is, returns to step S30.

If there is not error between the FEC rate of the detected satellite and a FEC rate among the several standardized FEC rates, the satellite receiver detects a digital satellite.

After finding a digital satellite, the demultiplexer 6 decodes the verification information of the satellite to watch. (S90) The verification information of the satellite is the transponder information and channel information.

The verification information of the satellites is stored in the microprocessor 5. Accordingly, the microprocessor 5 determines if the detected satellite is the desired satellite, based on the verification information of the satellites in the area where the satellite antenna is located.

That is, the microprocessor compares the transponder information and the channel information of the detected satellite decoded by the demultiplexer 6 and the transponder information and the channel information of the satellites stored in the microprocessor 5. (S100) If the transponder information and the channel information of the detected satellite decoded by the demultiplexer 6 accords with the transponder information and the channel information of the satellites stored in the microprocessor 5, the detected satellite is the desired satellite to watch. If the transpoder information and channel information of the desired satellite does not correspond with the transpoder information and channel information of the detected satellite, the satellite antenna restarts to move and comparing between the transpoder information and channel information of the desired satellite and the transpoder information and channel information of the detected satellite is continued, until the desired satellite is detected. The desired satellite can be detected until the satellite antenna reaches the moving limit of the satellite antenna, if the above operation is performed.

The verification information and the position information of the detected satellite is stored in order that seeing the satellite broadcast be facilitated. thereafter (S110)

The transponder information and channel information of the satellite is used as the verification information of the satellite and the number of pulse generated by antenna driver from the moving limit of the satellite antenna to the direction of the satellite antenna is used as the position information of the satellite.

The above operation is repeated and the position information of the satellites is stored in the microprocessor.

The user can see a desired satellite broadcast if the user inputs name of the desired satellite, since the position information of the satellite is stored in the microprocessor 5. If the name of the desired satellite is inputted, the satellite antenna moves to the direction of the desired satellite antenna according to the position information stored in the microprocessor 5.

Accordingly, the initial setting of satellite information of the satellite which transmits the desired satellite broadcast can be performed conveniently and the satellite antenna can detect the satellite antenna exactly, in accordance with the second embodiment of the present invention.

A second embodiment of the present invention will be explained hereinafter with reference to figures.

Figure 5:
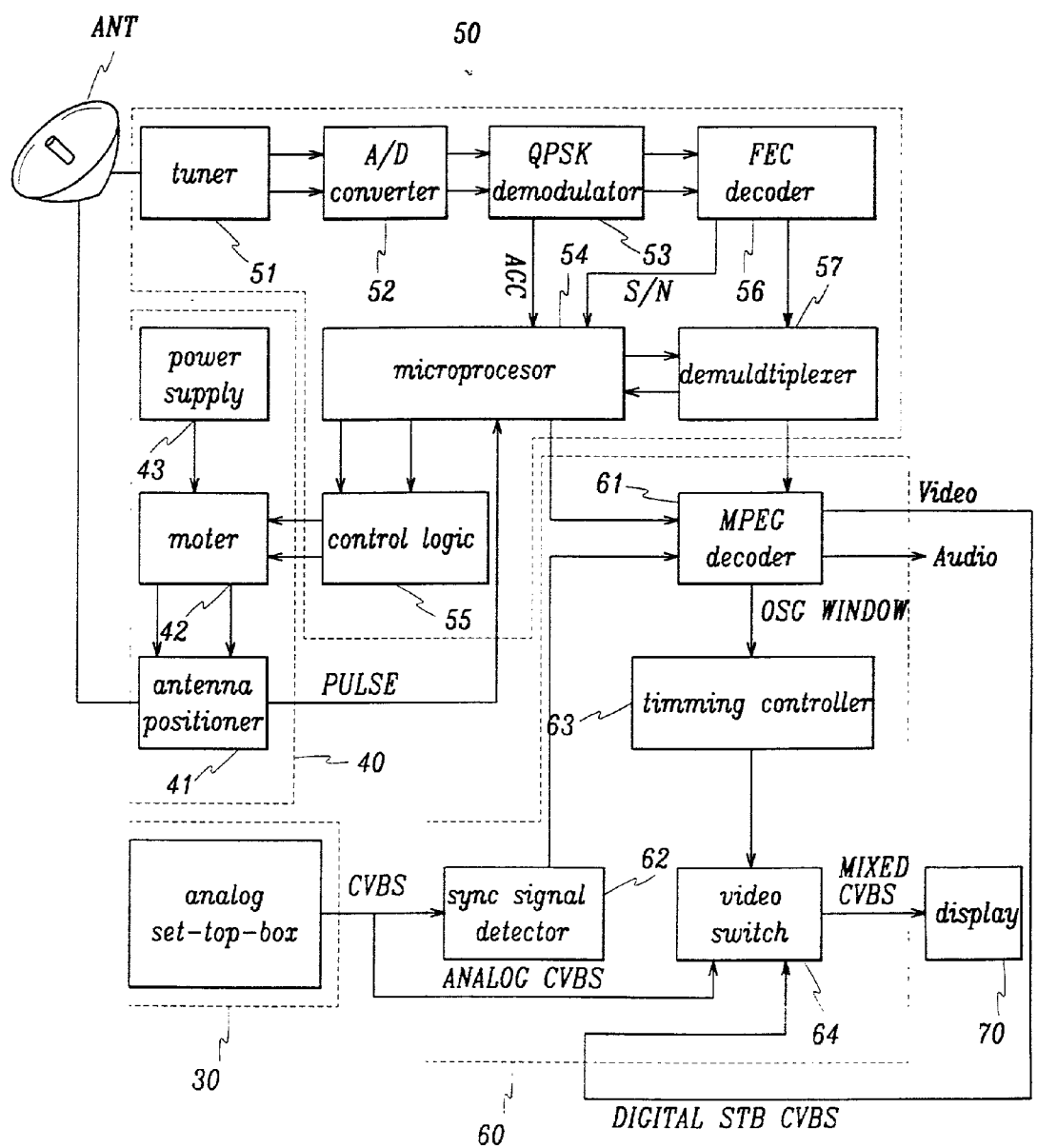
FIG. 5 shows a satellite broadcast receiver in accordance with a second embodiment of the present invention.

FIG. 5 shows a satellite broadcast receiver in accordance with a second embodiment of the present invention.

As shown in FIG. 5, the satellite broadcast receiver comprises an analog set-top box 30, a satellite antenna 40, a digital set-top box 50, a graphic menu generator 60, and a display device 70.

The analog set-top box 30 receives analog signal and controls direction of the satellite antenna.

The satellite antenna 40 comprises an antenna positioner 41, motor 42, and a power supply 43. The antenna positioner 41 mounts the antenna on itself and controls the position of the antenna. The motor 42 is connected to the positioner 41 and drives the antenna positioner 41. The power supply 43 is connected to the motor 42 and supplies power to the motor 42.

The digital set-top box 50 comprises a tuner 51, an A/D converter 52, a QPSK demodulator 53, a microprocessor 54, a control logic 55, a FEC decoder 56, and a demultiplexer 57.

The tuner 51 receives a desired channel signal. The A/D converter 52 receives an analog signal from the tuner 51 and converts the analog signal into a digital signal. The QPSK demodulator 53 receives the digital signal from the A/D converter and demodulates the digital signal. The FEC decoder 56 receives the demodulated signal from the QPSK demodulator 53 and corrects an error. The demultiplexer 54 receives the corrected signal from the FEC decoder 56 and demultiplexes the corrected signal. The microprocessor 54 receives the output signal of the demultiplexer 54 and the output signal of the QPSK demodulator 53 and controls the direction of the satellite antenna. The control logic 55 receives a control signal to control the direction of the satellite antenna and transfers the signal to the motor 42.

The graphic menu generator 60 comprises a synchronizing signal detector 62, moving picture expert group(MPEG) decoder 61, a timing controller 63, and a video switch 64.

The synchronizing signal detector 62 receives an analog image signal from the analog set-top box 30, and detects a horizontal synchronizing signal and a vertical synchronizing signal thereof. The MPEG decoder 61 receives a horizontal synchronizing signal and a vertical synchronizing and outputs position information about on screen graphic menus and digital graphic menu signals, and decodes and outputs the digital video signal received from the demultiplexer 57. The timing controller 63 receives the position information about the graphic menu from the MPEG decoder 61 and adjusts the timing of the graphic menu signal appropriate to a standard video synchronizing signal and outputs the control signal. The video switch 64 receives the digital graphic menu signal from the graphic menu generator 60 and the analog image signal from the analog set-top box 30 and digital image signal from the MPEG decoder 61, and selectively outputs the digital graphic menu signal, the analog image signal, or digital image signal according to the OSG information about the graphic menu by the timing controller 63.

Figure 6:
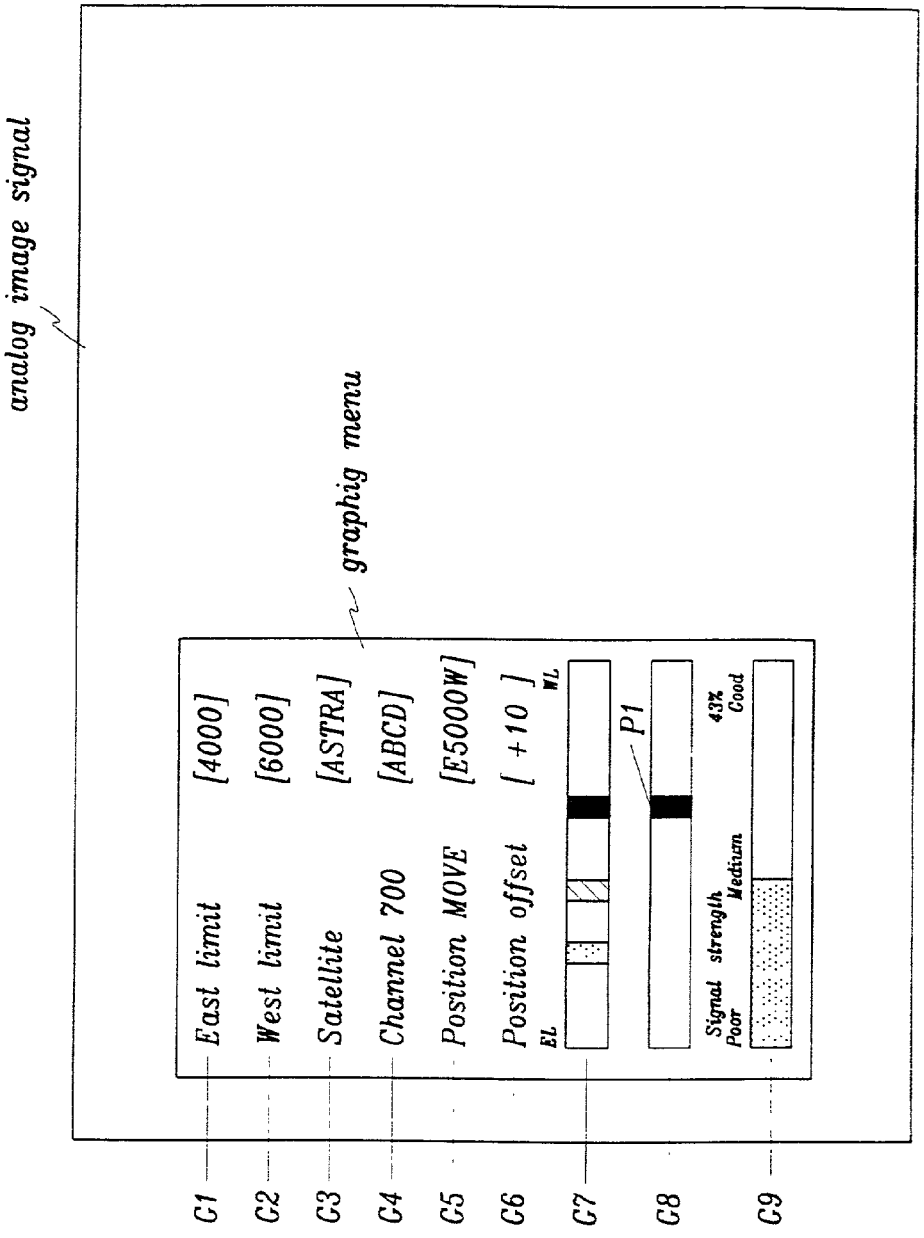
FIG. 6 shows a display device when receiving analog satellite broadcast in accordance with the second embodiment of the present invention.

FIG. 6 shows a display device when receiving analog satellite broadcast in accordance with the second embodiment of the present invention.

FIG. 7 shows a display device when receiving digital satellite broadcast in accordance with the second embodiment of the present invention.

As shown in FIG. 6 and FIG. 7, the display device 70 displays a plurality of menus on the display device 70.

A satellite broadcast receiver and a method for receiving satellite broadcast will be explained hereinafter.

This embodiment relates to receiving satellite broadcast conveniently by overlaying the graphic menu for displaying the position of satellites and the direction of the satellite antenna. The graphic menu displayed on the display device will be explained mainly hereinafter.

Firstly, the display device of an analog satellite broadcast receiver will be explained with reference to figures.

The graphic menu displayed on the satellite broadcast receiver differ in accordance with the analog satellite broadcast or the digital satellite broadcast.

As shown in FIG. 7, when digital satellite broadcast is received, the graphic menu is displayed on all the display device.

As shown in FIG. 6, when analog satellite broadcast is received, the graphic menu is overlaid on the analog image.

A process of displaying the graphic menu on the analog image will be explained.

Figure 9:
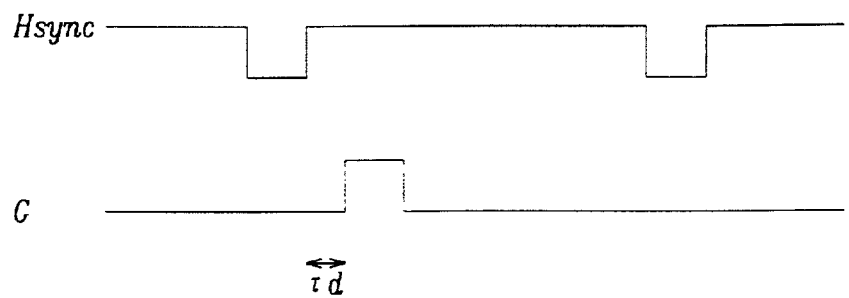
FIG. 9 shows a timing chart which displays graphic menus on a display device according to a synchronizing signal of the second embodiment of the present invention.

FIG. 9 shows a timing chart which displays graphic menus on a display device according to a synchronizing signal of the second embodiment of the present invention The synchronizing signal detector 62 receives analog image signal(CVBS) from the analog set-top box 30 and detects the horizontal synchronizing signal and vertical synchronizing signal from the analog image signal.

The MPEG decoder 61 receives the horizontal synchronizing signal and vertical synchronizing signal, and generates and outputs the digital graphic menu signal and information about the position of the digital graphic menu, and set the position of the digital graphic menu after the predetermined time $\tau_d$ from the start time of the horizontal synchronizing signal and vertical synchronizing signal. Particularly, as shown in FIG. 9, after the predetermine time is elapsed from the start time of clock of the horizontal synchronizing signal, the graphic menu signal is applied.

The timing controller 63 receives the graphic menu signal and the information about the position of the graphic menu from the MPEG decoder 61 and controls the timing of the synchronizing signal appropriate to the standard video synchronizing signal, and then outputs the control signal of the synchronizing signal.

The video switch 64 receives the digital graphic menu signal from the graphic menu generator 60 and the analog image signal from the analog set-top box 30 and digital image signal from the MPEG decoder 61, and selectively outputs the digital graphic menu signal, the analog image signal, and digital image signal according to the OSG information about the graphic menu of the timing controller 63.

The graphic menus displayed on the display device and the operation of the detecting satellites will be explained hereinafter.

Firstly, a method for detecting an analog satellite by using graphic menu will be explained hereinafter.

FIG. 6 shows an example of a method for receiving a satellite broadcast in accordance with the second embodiment of the present invention.

As shown in FIG. 6, graphic menus when analog satellite broadcast is received are overlaid on the analog image. The graphic menus comprises a menu G1 which indicates a east moving limit of the satellite antenna by numerical values, a menu G2 which indicates a west moving limit of the satellite antenna by numerical values, a menu G3 which indicates a desired satellite name, a menu G4 which indicates the channel of the detected satellite, a menu G5 which indicates the present position of the satellite by a relative numerical values to the moving limit of the satellite antenna, a menu G6 which indicates a directional error of the satellite antenna, a menu G7 which indicates the positions of the pre-found satellites by using makings within the bar menu representing the moving limit of the satellite antenna, a menu G8 which indicates the present direction of the satellite antenna, and a menu G9 which indicates a magnitude of the satellite signal received by the satellite antenna.

The menu G1 displays the east limit of the satellite antenna and the menu G2 displays the west limit of the satellite antenna by numerical values. When the menu G1 and G2 are selected by user, the west and east moving limit of the satellite antenna is set with the satellite antenna moving and the numerical value of the moving limit of the satellite antenna is displayed on the menu G1 and G2.

The menu G3 indicates name of the satellite. When the menu G3 is selected by user, the satellite antenna of the menu G3 is detected automatically.

The menu G4 indicates a channel of the satellite.

The menu G5 displays the relative position of the satellite, which is selected in the menu G3, by numerical values. The relative position is the relative position to the moving limit of the satellite antenna. How far is the satellite from the moving limit of the satellite antenna can be known by the menu G5.

The menu G6 indicates the position error of the satellite antenna. The position error of the satellite antenna may develop due to rain and wind or so. When the menu G6 is selected by user, the position error of the satellite antenna is compensated for.

The menu G7 displays the relative position of the pre-found satellites on the bar menu which indicates the moving limit of the satellite antenna by markings, of which color is different from the bar menu. Accordingly, the position of the satellites can be concerned easily, though many satellites are.

The menu G8 is the graphic menu which indicates the present direction of the satellite antenna and is displayed on the bar menu which indicates the moving limit of the satellite antenna by the markings of which color is different from the bar menu.

The menu G9 is the graphic menu which indicates a magnitude of the signal received by the satellite antenna and is indicated with an automatic gain control (AGC) level.

The operation of receiving analog satellite broadcast will be explained hereinafter.

Generally, when user operates a satellite broadcast receiver, the channel and the direction of the satellite antenna is not set. Even though the channel and the direction of the satellite antenna is set, the setting does not conforms to the area where the satellite antenna is located. Accordingly, the user of the satellite broadcast receiver must set the direction and the channel of the satellite antenna when he uses at first and when he wants to see a new satellite broadcast.

The operation of the setting the direction of the satellite antenna is as follows.

Firstly, the moving limit of the satellite antenna is set by the menu G1 and G2 being selected. Satellites within the moving limit of the satellite antenna can be seen.

Thereafter, the satellite antenna receives the signal transmitted from the satellites, until the signal is maximum, with changing of the direction of the satellite antenna. If the magnitude of the satellite antenna reaches maximum, the satellite antenna stop moving. Receiving the maximum signal means by detecting a satellite. Then, the user determines if the detected satellite is the desired satellite by seeing the analog image back of the graphic menu displayed on the display device 70. If the detected satellite is the desired satellite, the channel information and the position information of the detected satellite are stored. Then, a new making, of which color is different from that of the bar menu, is generated on the bar menu of the menu G7. If the detected satellite is not the desired satellite, the above operation is repeated.

If a plurality of satellites are detected by above operation, a plurality of markings having different colors are generated on the menu G7.

After first setting of the direction of the satellite antenna according to the above operation, if the user selects the desired satellite on the menu G3, the marking of the selected satellite twinkles on the menu G7 and the color of the marking, which indicates the present direction of the satellite antenna on the menu G8, changes as same as the color of the marking of the selected satellite on the menu G7, and the direction of the satellite antenna moves into the direction of the selected satellite on the menu G7.

An example of a process for receiving satellite broadcast will be explained hereinafter with reference to FIG. 8.

Figure 8:
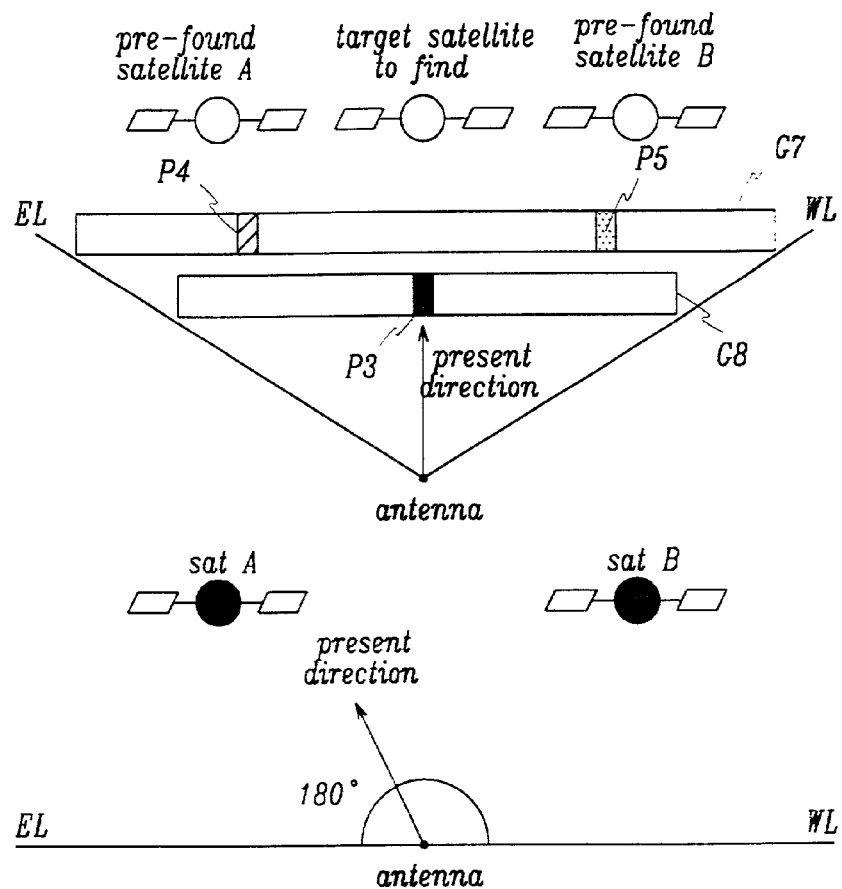
FIG. 8 shows an example of a method for receiving a satellite broadcast in accordance with the second embodiment of the present invention.

FIG. 8 shows an example of a method for receiving a satellite broadcast in accordance with the second embodiment of the present invention.

As shown in FIG. 8, the present direction of the satellite antenna and the position of the pre-found satellites A and B are displayed. If the user selects satellite A on the menu G3, color of a making P3 on the menu G8 changes as same as a making P4 on the menu G7 and the marking P3 moves to the same position of making P4 on the menu G8, and the satellite antenna moves to the direction of the satellite A. Accordingly, user can see the satellite broadcast transmitted from satellite A.

A user of the satellite broadcast receiver can see the desired analog satellite conveniently, if he selects name of the satellite on the menu G3 and can know how much and which direction moves the satellite antenna to see desired satellite broadcast, in accordance with the second embodiment of the present invention.

The method for receiving digital satellite broadcast using graphic menu will be explained hereinafter with reference to FIG. 7.

FIG. 7 shows a display device when receiving digital satellite broadcast in accordance with the second embodiment of the present invention.

As shown in FIG. 7, a graphic menu when receiving digital satellite broadcast comprises a menu G11 which indicates a east moving limit of the satellite antenna by numerical values, a menu G12 which indicates a west moving limit of the satellite antenna by numerical values, a menu G13 which indicates a desired satellite name, a menu G14 which indicates the present position of the satellite by a relative numerical values to the moving limit of the satellite antenna, a menu G15 which indicates a directional error of the satellite antenna, a menu G16 which enables the satellite antenna of the menu G13 to be found when selected by user, a menu G17 which enables a transponder information of the detected satellite to be found when selected by user, a menu G18 which enables a plurality of the selected satellites and the transponder information of the selected satellites to be found simultaneously when selected by user, a menu G19 which indicates the positions of the pre-found satellites by using makings within the bar menu representing the moving limit of the satellite antenna, a menu G20 which indicates the present direction of the satellite antenna, and a menu G21 which indicates a magnitude of the satellite signal received by the satellite antenna.

The operation of the menus G11, G12, G13, G14, G15, G19, G20, and G21 is as same as the menu G1, G2, G3, G4, G5, G7, G8, and G9, so the explanation of the operation about the menus will be skipped hereinafter.

The menu G16 enables the satellite of the menu G13 to be found when selected by user.

The menu G17 enables the transponder information and channel information of the detected satellite in the menu G16 to be detected when selected by user.

The menu G18 enables a plurality of the selected satellites and the transponder information of the selected satellites to be found simultaneously when selected by user.

The operation of receiving digital satellite broadcast with graphic menus will be explained hereinafter.

Firstly, a user set the moving limit of the satellite antenna by selecting the menu G11 and G12 as receiving the analog satellite broadcast. When the moving limit of the satellite antenna is set, a numerical value of the moving limit of the satellite antenna is displayed on the menu G11 and G12.

Thereafter, the user inputs a desired satellite on the menu G13. Then, if the user selects the menu G16, the selected satellite on the menu start to be detected with the satellite antenna moving. When a magnitude received by the satellite antenna, which is displayed on the menu G21, reaches maximum value, the satellite antenna stop to move. Then, the marking P2 of the menu G20 moves, as the satellite antenna moves.

Thereafter, if the user selects the menu G17, the transponder information and the channel information of the detected satellite are detected, and thereafter the transponder information and the channel information of the detected satellite and the transponder information and the channel information of the desired satellite are compared. If the transponder information and the channel information of the detected satellite corresponds to the transponder information and the channel information of the desired satellite, it means that the desired satellite is detected. Then the transponder information and the position information of the detected satellite displayed on the menu G14 are stored, and a new marking of which color is different from color of the menu G19 is generated on the menu G19. If the transponder information and the channel information of the detected satellite does not correspond to the transponder information and the channel information of the desired satellite, the above operation is repeated with the satellite antenna moving.

After the above operation of the present invention, the satellite information of a plurality of satellites is set and a plurality of markings corresponding to the satellites having different colors id generated on the menu G19. Thereafter, if the user selects a desired satellite on the menu G13, color of the marking P2 indicating the present direction of the satellite antenna on the menu G20 changes as same as the marking corresponding to the selected satellites on the menu G19 and the marking P2 moves to the same position of making on the menu G19, and the satellite antenna moves to the direction of the selected satellite. Accordingly, user can see the satellite broadcast transmitted from the desired satellite.

A user can see versatile satellite broadcast conveniently due to the graphic menus in accordance with the second embodiment of the present invention.

A third embodiment of the present invention will be explained hereinafter with reference to figures.

Figure 10:
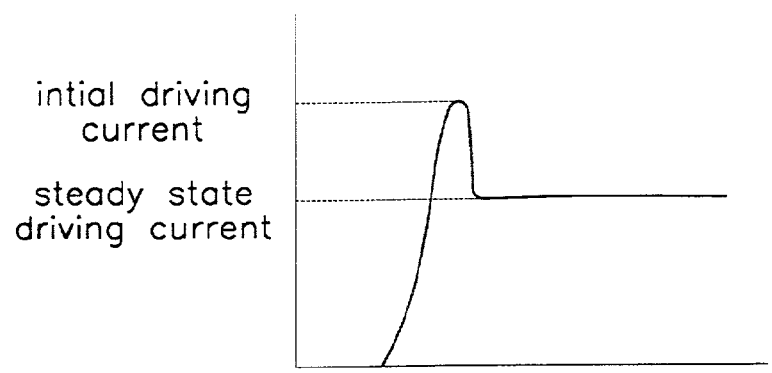
FIG. 10 shows current flowing in a switch of an antenna driver when initially driving the satellite antenna in accordance with a third embodiment of the present invention.

FIG. 10 shows current flowing in a switch of an antenna driver when driving the satellite antenna initially in accordance with a third embodiment of the present invention.

Figure 11:
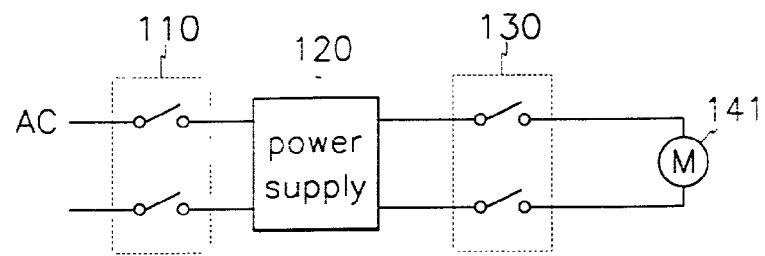
FIG. 11 shows a satellite antenna driver in accordance with the third embodiment of the present invention.

FIG. 11 shows a satellite antenna driver in accordance with the third embodiment of the present invention.

An antenna driving device in accordance with the third embodiment of the present invention comprises a plurality of switches 110, a power supply 120, a plurality of switches 130, and a motor 140. The switches 110 receives current, and the power supply is connected to the switches 110, and the switches 130 are connected to the power supply 120, and the motor 140 is connected to the switch 130.

The operation of the antenna driving device in accordance with the third embodiment of the present invention will be explained hereinafter.

In the antenna driving device, the switches 110 are connected between the power supply 120 and power reservoir. Electronic and mechanical switches can be used as switches 110. The power supply 120 receives current and outputs direct current having predetermined voltage. A switching mode power supply or linear power supply are used as the power supply 120. The switches determines rotational direction of the motor in accordance with the state of the connection.

After the switches are connected between the motor 140 and the power supply 120, the switches 110 are connected.

As shown in FIG. 10, a over current flows into the antenna driving device, when power is supplied at first. When power is supplied with switches on in the conventional antenna driving device, much heat and flash is generated in the contact of the switches 130 and the contact of the switches 130 melted, since the contact of the area of the switches 130 is small and the resistance of the switches is big.

This embodiment of the present invention solves the above problem by enlarging the area of the contact of the switches 130 when power is supplied. That is, the generation of heat decreases.

In this embodiment, the switches 110 are connected after the switches 130 are connected. Since power is supplied by connecting the switches 110 after connecting the switches 130, the switches 130 has been connected when power is supplied. Accordingly, the area of the contact of the switches 130 is big and the resistance of switches 130 when power is supplied decreases.

The melting of the contact of the switches is prevented and the wrong operation of the antenna driving device is prevented, in accordance with the third embodiment of the present invention.

A fourth embodiment of the present invention will be explained with reference to figures.

Figure 12:
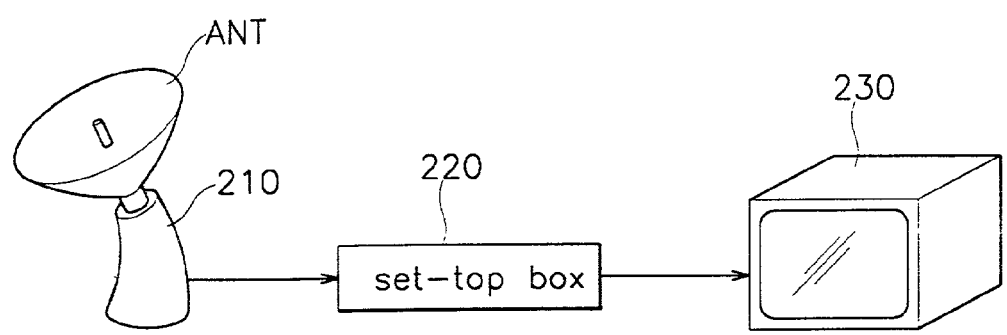
FIG. 12 shows a satellite broadcast receiver in accordance with a fourth embodiment of the present invention.

FIG. 12 shows a satellite broadcast receiver in accordance with a fourth embodiment of the present invention.

As shown in FIG. 12, a satellite broadcast receiver comprises a satellite antenna 210, a positioner 220, a set-top box 230, and a display device 240.

Figure 13:
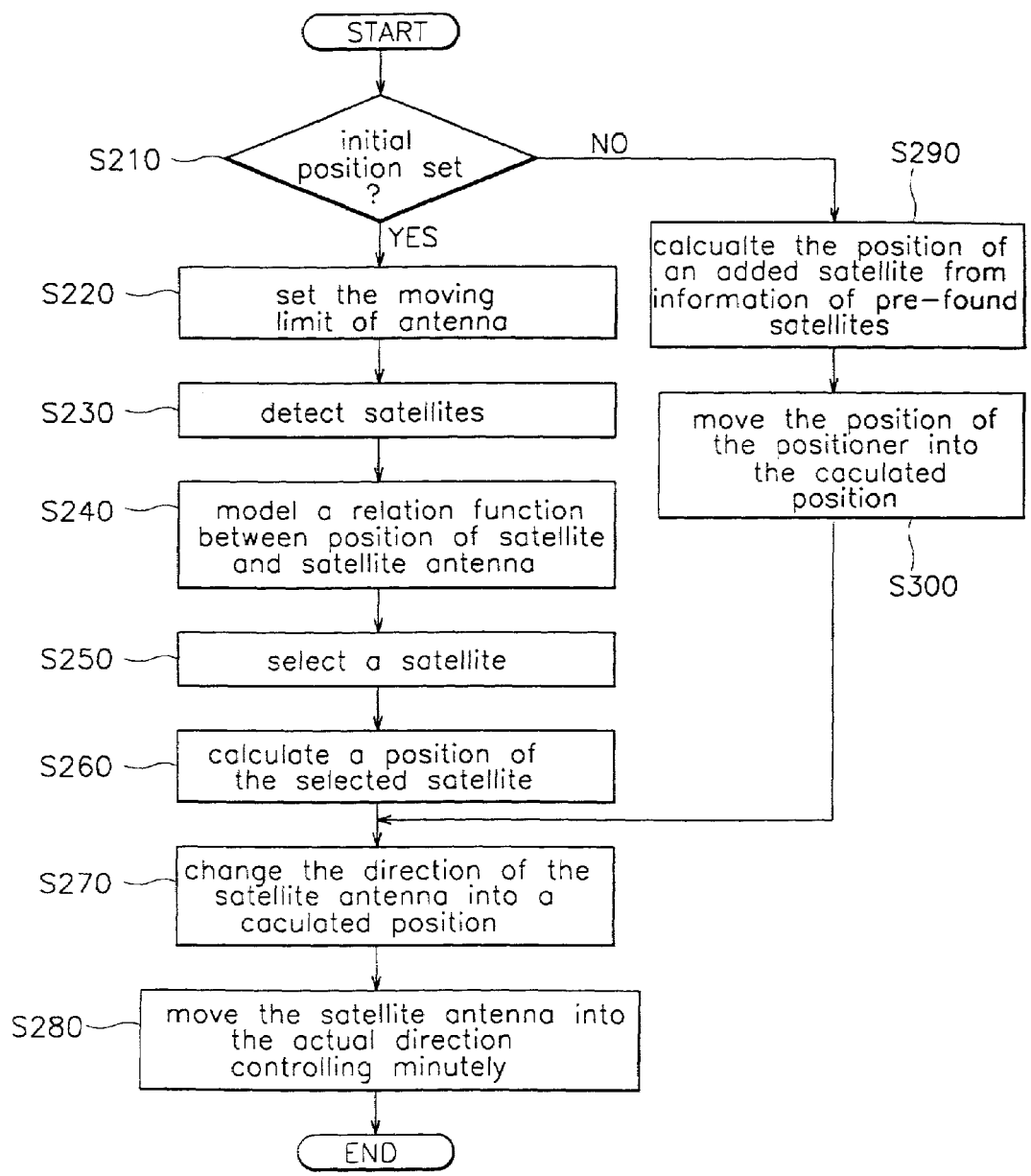
FIG. 13 shows a flow chart of a method for receiving satellite broadcast in accordance with the fourth embodiment of the present invention.

FIG. 13 shows a method for receiving satellite broadcast in accordance with the fourth embodiment of the present invention.

Firstly, determine if a detection of satellite is initial setting of the satellite antenna. (S210)

If the detection of the satellite is an initial setting of the satellite antenna, the satellite antenna sets the moving limits of the satellite antenna to the west and to the east. (S220) The west moving limit can be set first or the east limit can be set first. The moving of the satellite antenna can be performed by manual or automatically.

Thereafter, the satellite antenna changes the direction of the satellite antenna from a moving limit of the satellite antenna to the other moving limit of the satellite antenna and detects a plurality of satellites. (S230) The detection of the satellites is to model the relation function between the position of the satellites and the direction of the satellite antenna. The number of the satellite changes in accordance with a kind of the relation function.

A principle of modeling the relation function between the position of the satellites and the direction of the satellite antenna will be explained with reference to figures.

Figure 14:
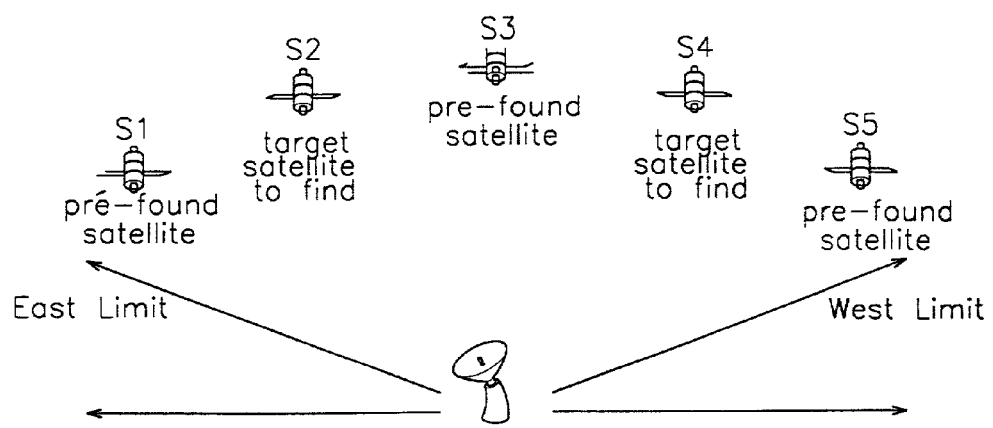
FIG. 14 shows an example of the method for receiving satellite broadcasts in accordance with the fourth embodiment of the present invention.

FIG. 14 shows an example of the method for receiving satellite broadcast in accordance with the fourth embodiment of the present invention.

Figure 15:
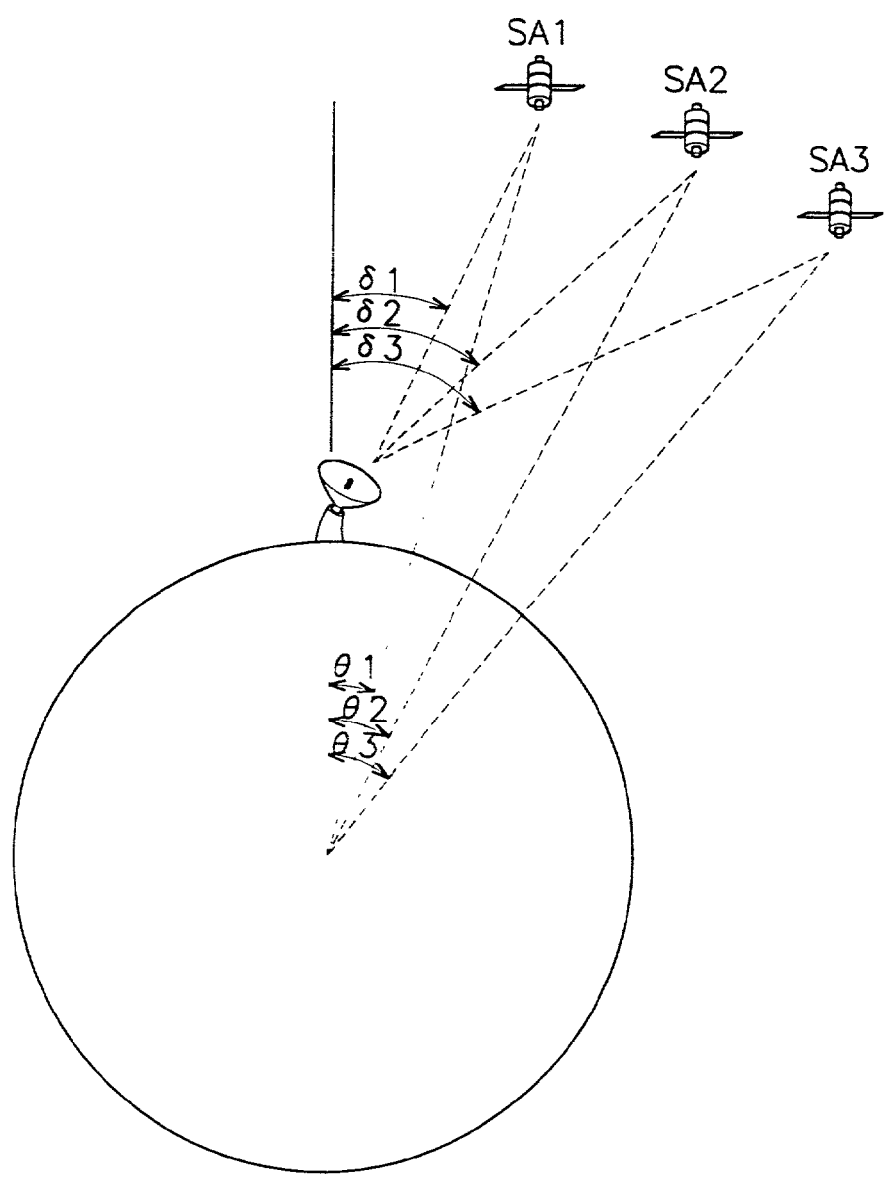
FIG. 15 shows a relation between direction of the satellite antenna and position of the satellites seen from the above of the north pole of the earth.

FIG. 15 shows position relation between the satellite antenna and the satellites seen from the above of the north pole of the earth.

Figure 16:
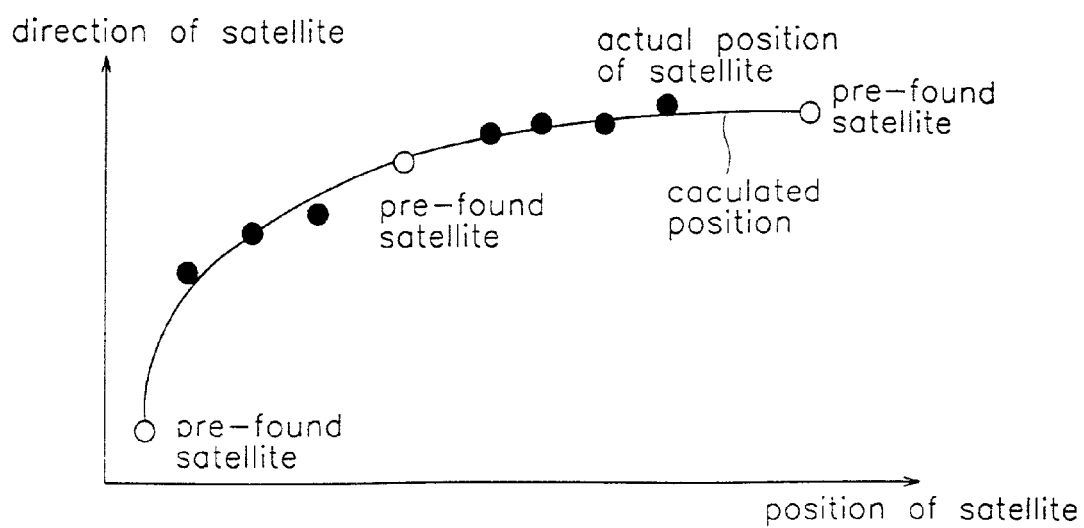
FIG. 16 shows a modeling curve of the relation between the satellites and the satellite antenna in accordance with the fourth embodiment of the present invention.

FIG. 16 shows a modeling curve of the relation between the satellites and the satellite antenna in accordance with the fourth embodiment of the present invention.

The position of the satellite can be known by the longitude and the latitude of the satellite. Since the satellite for satellite broadcast revolves above the equator in the same direction of the earth's rotation, the satellites is seen as standstill on the earth. So, the satellite is called geostationary satellite. Accordingly, the satellite for satellite broadcasting has constant position relation to the satellite antenna.

The relation between the position of the satellite and the direction of the satellite antenna, as shown in FIG. 15, will be explained.

The direction of the satellite antenna is estimated by the azimuth angle of the satellite antenna from the east moving limit and the position of the satellite is estimated by the difference between the longitude of the area where the satellite antenna is located and the longitude of the satellite antenna. As the direction of the satellite antenna increases, the position of the satellite increases. The relation between the position of the satellite and the direction of the satellite antenna is nonlinear. Accordingly, the relation function between the position of the satellite and the direction of the satellite antenna is curve-type function.

There are an indeterminate function—for example, cos x, sin x, log x—and a polynomial function—$ax+bx^2+cx^3$—, in the curve-type function.

The case when the relation function is polynomial will be explained hereinafter. The relation function may be an indeterminate function.

The relation function should be a two and more order polynomial function. If $n_{th}$ order polynomial, n and more satellites should be detected. Then, as n is bigger, the exactness of the relation function goes high. Since an object of this embodiment is to reduce the time for detecting satellites by the modeled curve, second order polynomial is enough to detect the approximate position of the satellites. That is, if we use a relation function, as $y=ax^2+bx+c$, two and more satellites are enough to model the relation function, and three and more satellites are preferable to model the relation function.

Assuming the case three satellites are selected hereinafter.

It is preferable that the three satellites are far among each other, because, if the distance between the satellites used to model is small, the trust to the relation function is small.

It is more preferable that the three satellites are two satellites located next to the moving limit of the satellite antenna and a satellite located between the two satellites.

In this embodiment, three and more order function can be used to model the relation function between the position of the satellites and the direction of the satellite antenna.

The method of modeling the relation function between the satellites and the satellite antenna with $2_{nd}$ order polynomial will be explained hereinafter with reference to figures.

Firstly, detect three satellites. Three satellites are detected with the satellite antenna moving from one moving limit to the other moving limit. After three satellites are detected, the direction of the satellite antenna and the position of the satellite are stored.

Thereafter, the relation function between the position of the satellite and the direction of the satellite antenna are modeled based on the detected satellites. (S240)

Another satellite to detect is selected, after the relation function between the direction of the satellite antenna and the position of the satellites are modeled. (S250)

Then, an approximate direction of the satellite antenna is calculated using the modeled relation function between the direction of the satellite antenna and the position of the satellites. (S260)

Thereafter, the satellite antenna moves to the calculated direction from is modeled relation function between the direction of the satellite antenna and the position of the satellites. (S270)

A position error between the calculated direction of the satellite antenna and an actual direction of the satellite antenna is compensated for by controlling the direction of the satellite antenna minutely. (S280) The minute control of the direction of the satellite antenna can be performed by manual or automatically.

Thereafter the position of the detected satellites and the direction of the satellite antenna of the detected satellites are stored.

If a detection of satellite is not initial setting of the satellite antenna, the present invention models the relation function between the direction of the satellite antenna and the position of the satellites using pre-found satellites. (S290)

Thereafter, an approximate direction of the satellite antenna is calculated using the modeled relation function between the direction of the satellite antenna and the position of the satellites. The satellite antenna moves to the calculated direction from modeled relation function between the direction of the satellite antenna and the position of the satellites. (S300)

A position error between the calculated direction of the satellite antenna and an actual direction of the satellite antenna is compensated for by controlling the direction of the satellite antenna minutely. (S280)

A satellite receiver user can see satellite broadcast conveniently after the above operation of the present invention, when the user set the satellite antenna at first and adds another satellite to watch, in accordance with the fourth embodiment of the present invention.

In the present invention, the satellite receiver for receiving satellite broadcast is described, but the present invention can be applied to the satellite receiver for military satellite and communication satellite or so.

What is claimed is:

1. A digital analog satellite broadcast receiver comprising:
    a satellite antenna which moves and receives both an analog and a digital satellite signal;
    an analog set-top box which receives the analog satellite signal from the satellite antenna converts the analog satellite signal into an image signal, and controls a direction of the satellite antenna;
    a digital set-top box which receives the digital satellite signal from the satellite antenna, converts the digital satellite signal into an image signal, and controls the direction of the satellite antenna;
    a graphic menu generator which receives the image signals from the digital set-top box and the analog set-top box and generates a plurality of graphic menus for performing various satellite-detecting operations; and
    a display device which displays the graphic menus generated by the graphic menu generator.

2. The digital analog satellite broadcast receiver of claim 1, wherein the graphic menu generator comprises:
    a synchronizing signal detector which receives the image signal outputted from the analog set-top box and detects a horizontal synchronizing signal and a vertical synchronizing signal;

an MPEG decoder which receives the horizontal synchronizing signal and vertical synchronizing signal detected by the synchronizing signal detector, and generates and outputs a digital graphic menu signal and the information of a position of the digital graphic menu signal, and which receives the digital image signal from the digital set-top box, and decodes and outputs the digital image signal;

a timing controller which receives the information of the position of the digital graphic menu signal from the MPEG decoder and controls a timing of the signal so that the signal corresponds to a standard video synchronizing signal; and a video switch which receives the digital graphic menu signal and the digital image signal from the MPEG decoder and the analog image signal from the analog set-top box, and outputs the analog image signal, the digital graphic menu signal, and the digital image signal in accordance with the information about the position of digital graphic menu signal.

3. The digital analog satellite broadcast receiver of claim 2, wherein the graphic menu comprises:

a first menu which indicates a present direction of the satellite antenna using a bar menu representing a moving limit of the satellite antenna, markings being made within the bar menu indicating the present direction of the satellite antenna; and a second menu which indicates the present position of the satellite using a bar menu representing the moving limit of the satellite antenna, markings being made within the bar menu indicating the present direction of the satellite antenna.

4. The digital analog satellite broadcast receiver of claim 3, wherein the graphic menu further comprises:

a third menu, when selected by the user, which establishes an east limit and a west limit of the satellite antenna and displays these limits as numerical values;

a fourth menu which, when selected by the user, enables the selection of pre-set satellites;

a fifth menu which displays as a numerical value a relative position of the satellite selected in the fourth menu to the moving limit of the satellite antenna displayed in the third menu;

a sixth menu which displays a position error of the satellite antenna and which compensates for the position error of the satellite antenna by adding the position error displayed on the sixth menu to the moving limit displayed on the first menu and to the relative position of the satellite displayed on the fifth menu; and a seventh menu which displays a magnitude of the signal received by the antenna at the present position.

5. The digital analog satellite broadcast receiver of claim 3, wherein the first menu displays a relative position of pre-found satellites on the bar menu, using markings within the bar menu and having a different color from the bar menu, opposing ends of the bar menu respectively represent west limit and an east limit.

6. The digital analog satellite broadcast receiver of claim 3, wherein the second menu displays the relative direction of the satellite antenna on the bar menu using markings within the bar menu and having a different color from the bar menu, opposing ends representing a wet limit and an east limit.

7. The digital analog satellite broadcast receiver of claim 5 or claim 6, wherein the first, second, third, fourth, fifth, sixth, and seventh menus are overlaid on the analog image when the receiver receives the analog satellite signal.

8. The digital analog satellite broadcast receiver of claim 4, wherein the graphic menu further comprises:

an eighth menu which enables a detection of the satellite selected by the fourth menu, when the user selects the eighth menu;

a ninth menu which enables a detection and storage of the transponder information and position information of the satellite selected in the eight menu when user selects the ninth menu; and a tenth menu which enables an operation of the eighth menu and the ninth menu be performed on a plurality of satellites selected by the fourth menu when user selects the tenth menu, characterized in that the eight, ninth, and tenth menus are used when the digital analog satellite broadcast receiver receives the digital satellite broadcast.

9. The digital analog satellite broadcast receiver of claim 8, wherein the digital analog satellite broadcast receiver detects the satellites selected in the fourth menu by using the transponder information of the selected satellites as the satellite antenna moves between the moving limit of the satellite antenna.

10. The digital analog satellite broadcast receiver of claim 8, wherein the operation of storing the position information is performed to display the relative position of the satellites on the bar menu of the first menu with markings of a different color from the small bar menu and to store a relative position number based on the limit numerical value of the third menu.

11. A digital satellite broadcast receiver comprising:

a satellite antenna which receives a satellite signal while moving;

a digital set-top box which receives a digital satellite signal of the satellite signal, converts the digital satellite signal into an image signal, and controls a direction of the satellite antenna;

a graphic menu generator device which receives signals from the digital set-top box and generates a plurality of graphic menus for performing various satellite-detecting operations; and a display device which displays the graphic menus generated by the graphic menu generator, wherein the graphic menus include:

a first menu which indicates a present direction of the satellite antenna using a bar menu representing a moving limit of the satellite antenna, markings being a made within the bar menu indicating the present direction of the satellite antenna; and a second menu which indicates the present position of the satellite using a bar menu representing the moving limit of the satellite antenna, markings being a made within the bar menu indicating the present direction of the satellite antenna;

a third menu which enables a detection of a desired satellite broadcast when user selects the third menu by using a magnitude of the received signal and a transponder information of the satellite; and a fourth menu which enables a detection and a storage of the transponder information of the satellite and the position information of the satellite selected by the third menu; and a fifth menu which enables an the operation of the third menu and the fourth menu be performed on a plurality of satellites selected by the third menu when user selects the fifth menu.

12. A method for receiving satellite broadcast used for a satellite broadcast receiver including a display device to displaying a plurality of graphic menus which indicates moving limits and a position of a satellite antenna, and a position of satellites, the method comprising the steps of:

setting a numerical moving limit of the satellite antenna;

displaying a present direction of the satellite antenna with a graphic menu, the present direction of the satellite antenna being displayed on a first bar menu of the graphic menu indicating the moving limit of the satellite antenna;

displaying a magnitude of a signal received by the satellite antenna with a graphic menu on the display device;

determining if a detected satellite is a desired satellite when the signal received by the satellite antenna is maximum;

storing a relative position of the detected satellite and displaying in the display device the relative position of the detected satellite with a second bar menu of the graphic menu, the second bar menu indicating the moving limit of the satellite antenna;

displaying the present position of the satellite on the graphic menu of the display device with a relative quantity to the moving limit of the satellite antenna;

displaying a name of the satellites on the graphic menu;

displaying a position error of the satellite antenna with the relative quantity to the moving limit of the satellite antenna on the graphic menu; and compensating for the position error of the satellite antenna when the graphic menu indicating the position error is selected.

13. The method for receiving satellite broadcast of claim 12, further comprising steps of:

selecting a satellite of the detected satellites;

displaying movement of an indicator of the first menu to an indicator of the second menu indicating the selected satellite;

changing a direction of the satellite antenna toward a direction of the selected satellite automatically; and receiving the satellite signal.

14. The method for receiving satellite broadcast of claim 12, wherein the step of determining if the detected satellite is the desired satellite is performed by the user viewing an analog image signal display overlaid on the graphic menus on the display device.

15. The method for receiving satellite broadcast of claim 12, wherein the step of determining if the detected satellite is the desired satellite is performed, in the case where the satellite is a digital satellite, by comparing transponder information with transponder information of the desired satellite.

16. The method for receiving satellite broadcast of claim 13, wherein the steps of selecting the desired satellite and receiving the satellite signal is performed by changing a color of the indicator the second menu into a same color of the indicator of the first menu and moving the indicator of the second menu to a same position of the indicator of the second menu.

* * * * *